July 7, 1936. R. C. WARNEKE Re. 20,031
REFRIGERATING MACHINE
Original Filed Nov. 5, 1932
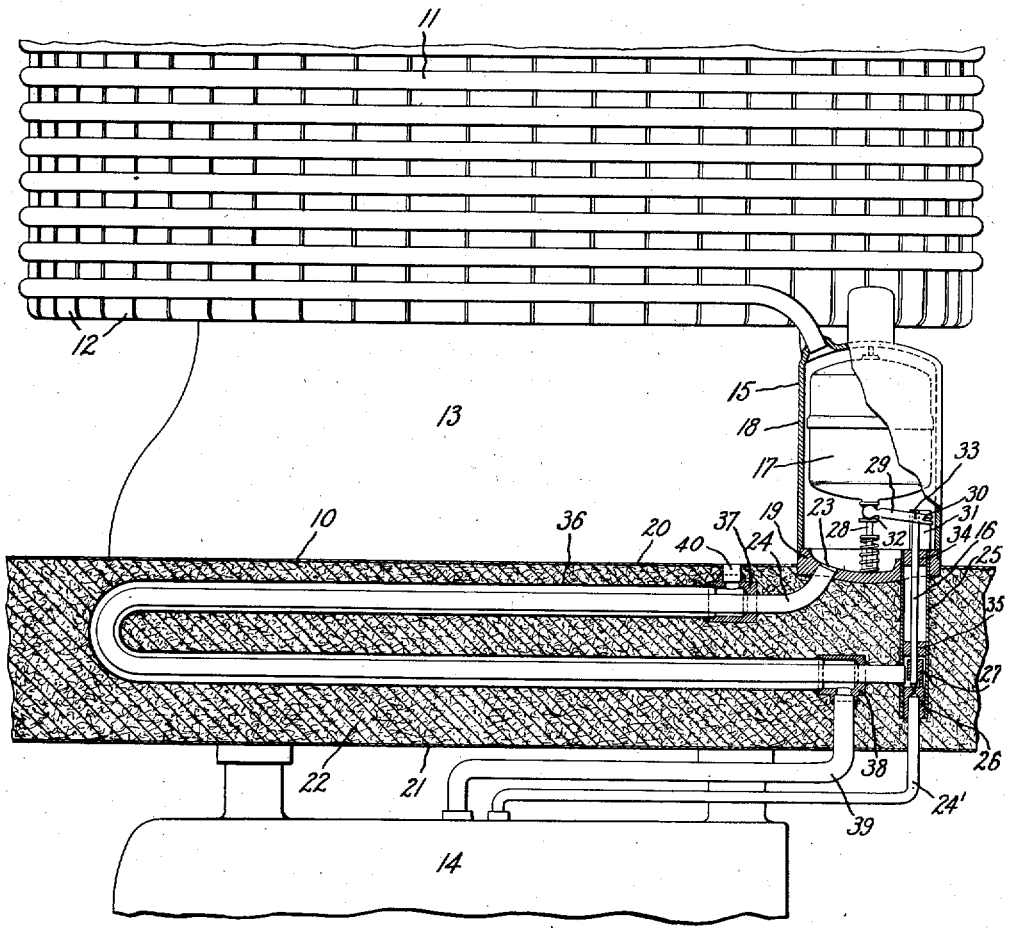
Inventor:
Roman C. Warneke,
by Charles W. Nullen
His Attorney.

Reissued July 7, 1936

Re. 20,031

UNITED STATES PATENT OFFICE 20,031

REFRIGERATING MACHINE

Roman C. Warneke, Fort Wayne, Ind., assignor to General Electric Company, a corporation of New York Original No. 1,930,296, dated October 10, 1933, Serial No. 641,348, November 5, 1932. Application for reissue June 14, 1935, Serial No. 26,646

20 Claims. (Cl. 62—115)

My invention relates to refrigerating machines and particularly to refrigerating machines of the type having a valve, or flow controlling device, for admitting refrigerant to the low pressure side of the system from the high pressure side thereof.

In connection with refrigerating systems adapted to cool a compartment, such as a domestic refrigerator, the usual procedure is to place within the compartment an evaporator which is supplied with liquid refrigerant from some external source, and to control the flow of the refrigerant to the evaporator by a suitable flow controlling device which maintains the necessary difference in pressure between the evaporator and the source of supply. When the refrigerant passes from the high pressure side of this flow controlling device to the low pressure side thereof, a portion of the refrigerant vaporizes due to the sudden reduction in pressure. The flow controlling device, therefore, absorbs heat from the adjacent parts of the system, and from the surrounding media which results in loss in capacity and efficiency of the system. Since the liquid refrigerant passing to the flow controlling device is normally at a temperature much higher than that of the compartment to be cooled, a large portion of the heat absorbing capacity of the refrigerant expanding at the flow controlling device is used in cooling the liquid refrigerant. If the liquid is cooled before passing to the valve there results a marked increase in the efficiency of the system.

It is an object of my invention to provide an arrangement for cooling the liquid refrigerant before it passes to the flow controlling device of a refrigerating system in order to maintain the heat absorbing capacity of the refrigerant for doing useful work in the compartment to be cooled.

Another object of my invention is to provide an improved refrigerating system utilizing the heat absorptive capacity of the vaporized refrigerant which is removed from the evaporating unit for the purpose of absorbing the heat which tends to flow to the flow controlling device from parts of the refrigerating system operating at a higher temperature.

A further object of my invention is to provide an improved float operated valve for controlling the flow of refrigerant in a refrigerating system in which the refrigerant supplied to the valve from the float chamber is pre-cooled and the operating connection between the float and the valve is of low heat conductivity.

Further objects and advantages of my invention will appear as the following description proceeds and the features of novelty which characterize my invention will be pointed out with particularity in the claims annexed to and forming a part of this specification.

In the single figure of the accompanying drawing, I have shown a fragmentary cross sectional view of a refrigerating apparatus embodying my invention.

In the drawing I have shown a mechanical refrigerating system embodying my invention mounted on an insulated wall 10 such as the top wall of a refrigerator compartment. The refrigerating system comprises a coiled tubular condenser 11 mounted on cooling fins 12 which are secured to a casing (not shown) which contains a motor and compressor and is mounted on the base 13. The base 13 is secured to the top of the wall 10 and below this wall is suspended an evaporator 14 for cooling the refrigerator compartment. Gaseous refrigerant condensed and liquefied in the condenser 11 flows into a float chamber 15, and the rate of flow of the liquid from the float chamber to the evaporator is regulated by a needle valve 16 connected by a link mechanism to be operated by the float 17 in the chamber 15.

In accordance with my invention I provide a heat exchange device between the float chamber and the float operated valve and surround both the heat exchange device and the valve by the insulation in the top wall of the refrigerator cabinet. The heat exchanger is so arranged that it uses the cold gaseous refrigerant withdrawn from the evaporator by the compressor to cool the liquid refrigerant passing from the float chamber to the valve. This arrangement insures the passage of low temperature liquid to the evaporator and also a minimum absorption of heat from parts of the system outside the refrigerator compartment. Referring again to the drawing, the float chamber 15 comprises an inverted cup-shaped member 18 secured by a fluid-tight joint to a base 19 which in turn is mounted on an upper plate 20 of the top 10. The top 10 is built up of the upper plate 20 and a lower plate 21 between which is arranged heat insulation 22. At one side of the base 19 is an outlet 23 in which is secured one end of a U-shaped conduit 24 leading from the float chamber 15 to a valve assembly embedded in insulation 22. This valve assembly is carried by the lower end of a tube 25 secured in an opening in the base 19 and extending downwardly into the insulation 22. In the preferred form of my invention the tube 25 and also the valve 16 are made of a material having a low thermal conductivity. I prefer to employ a copper-nickel alloy sold under the trade name of Monel metal for this purpose. The valve assembly arranged at the lower end of tube 25 consists of a plug 26 inserted in the lower end of the tube and having a bore extending centrally therethrough and a valve seat formed on its upper face which is arranged to cooperate with needle valve 16. Arranged above plug 26 and preferably formed integrally therewith I have shown a sleeve 27 which serves as a guide for the needle valve 16. A tube 24' is connected to the bore in plug 26 and leads to the evaporator 14 in the chamber to be cooled. The float 17 is arranged to slide vertically on a rod 28 within the chamber 15. The linkage arranged to operate the valve 16 in response to movement of the float comprises a lever 29 slidably pivoted at 30 on a support 31 and engaging the sides of a spool-shaped member 32 secured to the bottom of the float. The needle valve 16 is pivoted to the lever 29 at 33, and hence an upward movement of the float will lift the valve 16 from its seat in the plug 26. In order to prevent refrigerant from flowing through tube 25 to the valve assembly carried at its lower end, I have inserted in the tube, around the needle valve 16, two guides, 34 and 35 respectively. These guides form a sufficiently tight fit with the walls of the tube 25 and the needle valve 16 so that very little refrigerant can leak past the needle valve 16. This will be better understood when it is considered that there is very little pressure difference between the float chamber and the high pressure side of the valve. The heat exchange device which I provide to cool the liquid refrigerant prior to its passage through the valve 16 comprises a U-shaped conduit 36 concentrically surrounding the U-shaped conduit 24. The U-shape is employed in my preferred embodiment to permit the assembly of conduits 24 and 36 within the insulation 21 and still to maintain the necessary length of conduit to allow adequate heat exchange surface. The ends of conduit 36 are closed by caps 37 and 38 respectively, which are joined to the conduit 24 where it passes therethrough by any suitable means, such as brazing, so as to form fluid-tight joints. The evaporator is connected to one end of the conduit 36 by a conduit 39 entering the cap 38, and the intake of the compressor is connected with the other end by a suction conduit 40 entering the cap 37.

During the operation of the refrigerating system shown in the drawing, relatively warm liquid refrigerant supplied by the condenser 11 accumulates in the conduit 24 and in the float chamber 15. If the float and valve mechanism are in the position shown, the liquid will accumulate until there is sufficient to raise the float 17, whereupon needle valve 16 will be lifted and liquid refrigerant will be admitted to the conduit 24' and flow therethrough to the evaporator. At the same time gaseous refrigerant which is being withdrawn by the compressor will pass through the conduit 36 around the liquid refrigerant in the conduit 24 and in the counter-flow thereto and will cool the liquid. Since the heat exchanger is insulated by the surrounding insulation 22, substantially all the heat absorbed by the gaseous refrigerant must come from the liquid refrigerant in the conduit 24. This insures efficient operation of the heat exchanger. The liquid refrigerant passing through the valve will be additionally cooled, but this effect is minimized by the low temperature of the liquid, and substantially the entire heat absorptive capacity of the liquid refrigerant is made available for the doing of useful work within the refrigerator compartment.

The foregoing described arrangement of a flow-controlling valve and a heat exchanger for cooling the liquid refrigerant on the supply side of the valve, both the heat exchanger and the valve being thermally insulated from the ambient surrounding the compartment to be cooled, is described and claimed in a co-pending application of Christian Steenstrup, Serial No. 641,395, filed November 5, 1932, and assigned to the same assignee as the present application. The herein disclosed construction of the float chamber and a valve arranged within a tube of low thermal conductivity, and the arrangement of a valve guide formed in the plug closing the end of a tube is described and claimed in a co-pending application of Christian Steenstrup, Serial No. 641,396, filed November 5, 1932, and assigned to the same assignee as the present invention. I, therefore, do not herein claim anything shown or described in said Steenstrup applications which are to be regarded as prior art with respect to my present application.

Although I have shown and described my invention in connection with a refrigerating system of the mechanical type, it will be understood that it is equally applicable to other types of systems. I do not, therefore, desire my invention to be limited to the particular arrangement shown and described, and I intend in the appended claims to cover all modifications within the spirit and scope of my invention.

What I claim as new and desire to secure by Letters Patent of the United States, is:

1. A refrigerating system including a compartment surrounded by thermally insulated walls, an evaporator within said compartment, a condenser, a chamber outside said compartment for receiving liquid refrigerant from said condenser, a float in said chamber, a conduit connecting said chamber with said evaporator, a valve in said conduit controlled by said float, and means including a heat exchanger arranged within a wall of said compartment for cooling liquid refrigerant in said conduit between said chamber and said valve.

2. A refrigerating system including a compartment surrounded by thermally insulated walls, an evaporator within said compartment, a condenser, a chamber outside said compartment for receiving liquid refrigerant from said condenser, a float in said chamber, a conduit connecting said chamber with said evaporator, a valve in said conduit, means including a linkage of low thermal conductivity actuated by said float for controlling said valve, and means including a heat exchanger embedded in a wall of said compartment for cooling liquid refrigerant in said conduit between said chamber and said valve.

3. A refrigerating system including a compartment surrounded by thermally insulated walls, an evaporator within said compartment, a condenser, a chamber outside said compartment for receiving liquid refrigerant from said condenser, a float in said chamber, a conduit connecting said chamber with said evaporator, a valve in said conduit, means for controlling said valve in response to movement of said float, and means including a conduit embedded in a wall of said compartment in heat-exchanging relation with said first named conduit for passing cold gaseous refrigerant from said evaporator around said first named conduit to cool the liquid refrigerant therein between said chamber and said valve.

4. A refrigerating system including a compartment to be cooled, an evaporator, a valve thermally insulated from the ambient surrounding said compartment, means for supplying refrigerant to said evaporator through said valve and for maintaining a body of liquid refrigerant on the supply side of said valve, means for reducing the temperature of said body of liquid to approximately the temperature of the refrigerant in said evaporator, means exposed to the ambient temperature for controlling said valve, and means of low heat conductivity for connecting said valve to said last named means.

5. A refrigerating system including a compartment to be cooled, an evaporator, a valve thermally insulated from the ambient surrounding said compartment, means for supplying refrigerant to said evaporator through said valve and for maintaining a body of liquid refrigerant on the supply side of said valve, means for reducing the temperature of said body of liquid to approximately the temperature of the refrigerant in said evaporator, means operating at a higher temperature than said valve for controlling the same, and means of low heat conductivity for connecting said valve to said last named means.

6. A refrigerating system including a compartment to be cooled, an evaporator, a valve thermally insulated from the ambient surrounding said compartment, means for supplying refrigerant to said evaporator through said valve and for maintaining a body of liquid refrigerant on the supply side of said valve, means for withdrawing vaporized refrigerant from said evaporator, means utilizing the vaporized refrigerant for cooling said body of liquid, means operating at a higher temperature than said valve for controlling the same, and means of low heat conductivity for connecting said valve to said last named means.

7. A refrigerating system including a compartment to be cooled, an evaporator, a valve thermally insulated from the ambient surrounding said compartment, means having a float therein for supplying refrigerant to said evaporator through said valve and for maintaining a body of liquid refrigerant on the supply side of said valve, means for withdrawing vaporized refrigerant from said evaporator, means utilizing the vaporized refrigerant for cooling said body of liquid, and means including a connection of low heat conductivity and utilizing the movement of said float for controlling said valve.

8. A refrigerating system including a compartment to be cooled, an evaporator, a valve thermally insulated from the ambient surrounding said compartment, means including a float chamber having a float therein for supplying refrigerant to said evaporator through said valve and for maintaining a body of liquid refrigerant on the supply side of said valve, means for withdrawing vaporized refrigerant from said evaporator, means utilizing the vaporized refrigerant for cooling said body of liquid, and means utilizing the movement of said float for operating said valve, said last named means including a connection of low heat conductivity between said float chamber and said valve.

9. A refrigerating system including a compartment to be cooled, an evaporator, a valve thermally insulated from the ambient surrounding said compartment, means including a float chamber having a float therein for supplying refrigerant to said evaporator through said valve and for maintaining a body of liquid refrigerant on the supply side of said valve, means for withdrawing vaporized refrigerant from said evaporator, means utilizing the vaporized refrigerant for cooling said body of liquid refrigerant, and means utilizing the movement of said float for operating said valve, said last named means including a fluid-tight connection of low heat conductivity between the interior of said float chamber and said valve.

10. A refrigerating system including a compartment to be cooled, an evaporator, a valve thermally insulated from the ambient surrounding said compartment, means including a float chamber having a float therein for supplying refrigerant to said evaporator through said valve and for maintaining a body of liquid refrigerant on the supply side of said valve, means for withdrawing vaporized refrigerant from said evaporator, means utilizing the vaporized refrigerant for cooling said body of liquid, means utilizing the movement of said float for controlling said valve, said last named means including a conduit of low heat conductivity connecting the interior of said float chamber and said valve, and means in said conduit for substantially preventing the flow of refrigerant therethrough.

11. A refrigerating system including a compartment to be cooled, an evaporator, a valve thermally insulated from the ambient surrounding said compartment, means including a float chamber having a float therein for supplying refrigerant to said valve and for maintaining a body of liquid refrigerant on the supply side of said valve, means for withdrawing vaporized refrigerant from said evaporator, means utilizing the vaporized refrigerant for cooling said body of liquid, a conduit of low heat conductivity connecting the interior of said float chamber and said valve, means including a mechanical linkage extending through said conduit and utilizing the movement of said float for controlling said valve, and means for substantially preventing the flow of refrigerant through said conduit.

12. A refrigerating system including a compartment to be cooled having insulated walls, an evaporator, a flow controlling device thermally insulated from the ambient surrounding said compartment, means for supplying refrigerant to said evaporator through said flow controlling device and for maintaining a body of liquid refrigerant on the supply side of said flow controlling device, means for withdrawing vaporized refrigerant from said evaporator, and means utilizing the vaporized refrigerant for cooling said body of liquid, said body of liquid and said cooling means being arranged within the insulation forming the walls of said compartment.

13. A float operated valve for a refrigerating system comprising a float chamber having a float therein, a conduit extending from said float chamber, a valve in said conduit, said valve being surrounded by heat insulation, a second conduit in heat exchange relationship with said first mentioned conduit, and means including a connection of low heat conductivity between said float chamber and said valve and utilizing the movement of said float for controlling said valve.

14. A float operated valve for a refrigerating system comprising a float chamber having a float therein, a conduit extending from said float chamber, a valve in said conduit remote from said float chamber, a second conduit in heat exchange relationship with said first mentioned conduit, a tube of low heat conductivity connecting the interior of said float chamber with said valve, means in said tube for substantially preventing the flow of refrigerant therethrough, and means operating through the interior of said tube and utilizing the movement of said float for controlling said valve.

15. A float operated valve for a refrigerating system comprising a float chamber having a float therein, a conduit extending from said float chamber, a valve in said conduit remote from said float chamber, a second conduit in heat exchange relationship with said first mentioned conduit, a tube of low heat conductivity connecting the interior of said float chamber and said valve, and means operating through said tube for controlling said valve, said valve being surrounded by heat insulation.

16. A refrigerating system including a compartment to be cooled, an evaporator, a valve thermally insulated from the ambient surrounding said compartment, means including a float chamber having a float therein for supplying refrigerant to said evaporator through said valve and for maintaining a body of liquid refrigerant on the supply side of said valve, means for withdrawing vaporized refrigerant from said evaporator, means utilizing the vaporized refrigerant for cooling said body of liquid, a conduit connecting the interior of the float chamber and said valve, means extending through said conduit utilizing the movement of said float for controlling said valve, and means in said conduit for substantially preventing the flow of refrigerant therethrough.

17. A refrigerating system including a compartment to be cooled, an evaporator, a valve thermally insulated from the ambient surrounding said compartment, means including a float chamber having a float therein for supplying refrigerant to said valve and for maintaining a body of liquid refrigerant on the supply side of said valve, means for withdrawing vaporized refrigerant from said evaporator, means utilizing the vaporized refrigerant for cooling said body of liquid, a conduit connecting the interior of said float chamber and said valve, means including a mechanical linkage extending through said conduit and utilizing the movement of said float for controlling said valve, and means for substantially preventing the flow of refrigerant through said conduit.

18. A float operated valve for a refrigerating system comprising a float chamber having a float therein, a conduit extending from said float chamber, a valve in said conduit remote from said chamber, said valve being surrounded by heat insulation, means including a second conduit in heat exchange relationship with said first mentioned conduit between said chamber and said valve for cooling said first-mentioned conduit, and means including a connection between said float chamber and said valve and utilizing the movement of said float for controlling said valve.

19. A float operated valve for a refrigerating system comprising a float chamber having a float therein, a conduit extending from said float chamber, a valve in said conduit remote from said float chamber, a second conduit in heat exchange relationship with said first mentioned conduit, a tube connecting the interior of said float chamber with said valve, means in said tube for substantially preventing the flow of refrigerant therethrough, and means operating through the interior of said tube and utilizing the movement of said float for controlling said valve.

20. A float operated valve for a refrigerating system comprising a float chamber having a float therein, a conduit extending from said float chamber, a valve in said conduit remote from said float chamber, a second conduit in heat exchange relationship with said first mentioned conduit, a tube connecting the interior of said float chamber and said valve, and means operating through said tube for controlling said valve, said valve being surrounded by heat insulation.

ROMAN C. WARNEKE.